United States Patent [19]
Hsiao

[11] Patent Number: 5,455,564
[45] Date of Patent: Oct. 3, 1995

[54] INTELLIGENT ILLUMINATION APPARATUS

[76] Inventor: Chin-hsiung Hsiao, No. 28, Lane 4-5, Kuanghsing Rd., Taiping Hsiang, Taichung Hsien, Taiwan

[21] Appl. No.: 267,287

[22] Filed: Jun. 28, 1994

[51] Int. Cl.⁶ .................................... G08B 13/19
[52] U.S. Cl. .................. 340/567; 340/522; 340/541; 340/600
[58] Field of Search ................... 340/567, 522, 340/600, 541

[56]  References Cited

U.S. PATENT DOCUMENTS

| | | | |
|---|---|---|---|
| 4,663,521 | 5/1987 | Maile | 340/567 |
| 5,015,994 | 5/1991 | Hoberman et al. | 340/567 |
| 5,077,549 | 12/1991 | Hershkovitz et al. | 340/567 |
| 5,128,654 | 7/1992 | Griffin et al. | 340/567 |
| 5,309,145 | 5/1994 | Branch et al. | 340/567 |
| 5,349,330 | 9/1994 | Diong et al. | 340/567 |

*Primary Examiner*—Glen Swann

[57]  ABSTRACT

A light device which includes a fluorescent lamp may be manually turned on by a switch or may be automatically turned on when a human body is approaching within a predetermined distance and environmental lightness is below a predetermined level. The light device includes a DC/AC converter which when triggered by an auxiliary DC voltage can output a high frequency AC voltage to turn on the fluorescent lamp. A relay which is normally open is connected between the auxiliary DC voltage and the DC/AC converter. A battery charging device includes a rechargable battery which is charged when the switch is turned on and provides the auxiliary voltage when the switch is turned off. A human body detecting device generates a human approaching indicative signal in response to a human body approaching in a predetermined distance. A light illumination detecting device detects environmental lightness and outputs a lightness insufficiency indicative signal when the environmental lightness is less than a predetermined level. A timer/driving device energizes the relay in response to the presence of the human approaching indicative signal and the lightness insufficiency indicative signal, thus triggering the DC/AC converter to output the high frequency AC voltage to turn on the fluorescent lamp.

4 Claims, 1 Drawing Sheet

INTELLIGENT ILLUMINATION APPARATUS

BACKGROUND OF THE INVENTION

1. Field of the Invention

The present invention relates to an intelligent illumination apparatus for emitting light when the mains is suddenly cut off, or when the lightness of the environment around the intelligent illumination apparatus is below a predetermined level and a person is approaching a specific area around the intelligent illumination apparatus.

2. Description of the Prior Art

Illumination lights are used in every day life, yet sometimes people easily forget to turn off the lights thus causing waste. At night, the owner has to turn on the lights right after entering his house, thus causing inconvenience. Sometimes, the owner of a house leaves for a period of time, thus a thief can notice that the owner has left because the lights have remained in a same status, either off status or on status, during these periods. Some auxiliary lights are used to supply illumination when the mains are cut off, yet these auxiliary lights usually remain in an on status even when the mains supply has resumed, thus wasting power. It is requisite to provide an intelligent illumination apparatus for solving the afore-mentioned problems.

SUMMARY OF THE INVENTION

The primary objective of the present invention is to provide an intelligent illumination apparatus for emitting light in response to stimulations such as when a mains supply is cut off, a person is approaching a specific area near the illumination apparatus, and the lightness of the environment around the illumination apparatus is below a predetermined level, and stopping emitting light when none of the stimulations exist.

In accordance with one aspect of the invention, there is provided an intelligent illumination apparatus comprising a light means comprising a switch serially connected to a fluorescent lamp via a first relay which is normally open and being connected to an AC power source, a DC/AC converter connected to the fluorescent lamp via a normally closed contact of a second relay, a normally open contact of the second relay serially connected to a starter and together connected to the fluorescent lamp in parallel, the DC/AC converter comprising a triggering terminal connected to an auxiliary DC voltage via a third relay which is normally open, whereby the DC/AC converter when supplied with the auxiliary voltage will output a relatively high frequency AC voltage to turn on the fluorescent lamp; a battery charging means comprising a coil of the first relay, a coil of the second relay, a recharging circuit and a rechargeable battery and being connected to the AC power source via the switch of the light means, the rechargeable battery being charged to the auxiliary voltage via the AC power source and the recharging circuit when the switch of the light means is turned on and being available to supply the auxiliary voltage to the intelligent illumination apparatus when the switch of the light means is turned off; a human body detecting means generating a human approaching indicative signal in response to a human body approaching in a predetermined distance; a lightness detecting means detecting environmental lightness and outputting a lightness insufficiency indicative signal when the environmental lightness is less than a predetermined level; a timer/driving means energizing and turning on the third relay in response to the simultaneous presence of the human approaching indicative signal and the lightness insufficiency indicative signal, thus triggering the DC/AC converter to output the high frequency AC voltage to turn on the fluorescent lamp.

DETAILED DESCRIPTION OF THE PREFERRED EMBODIMENT

Figure 1:
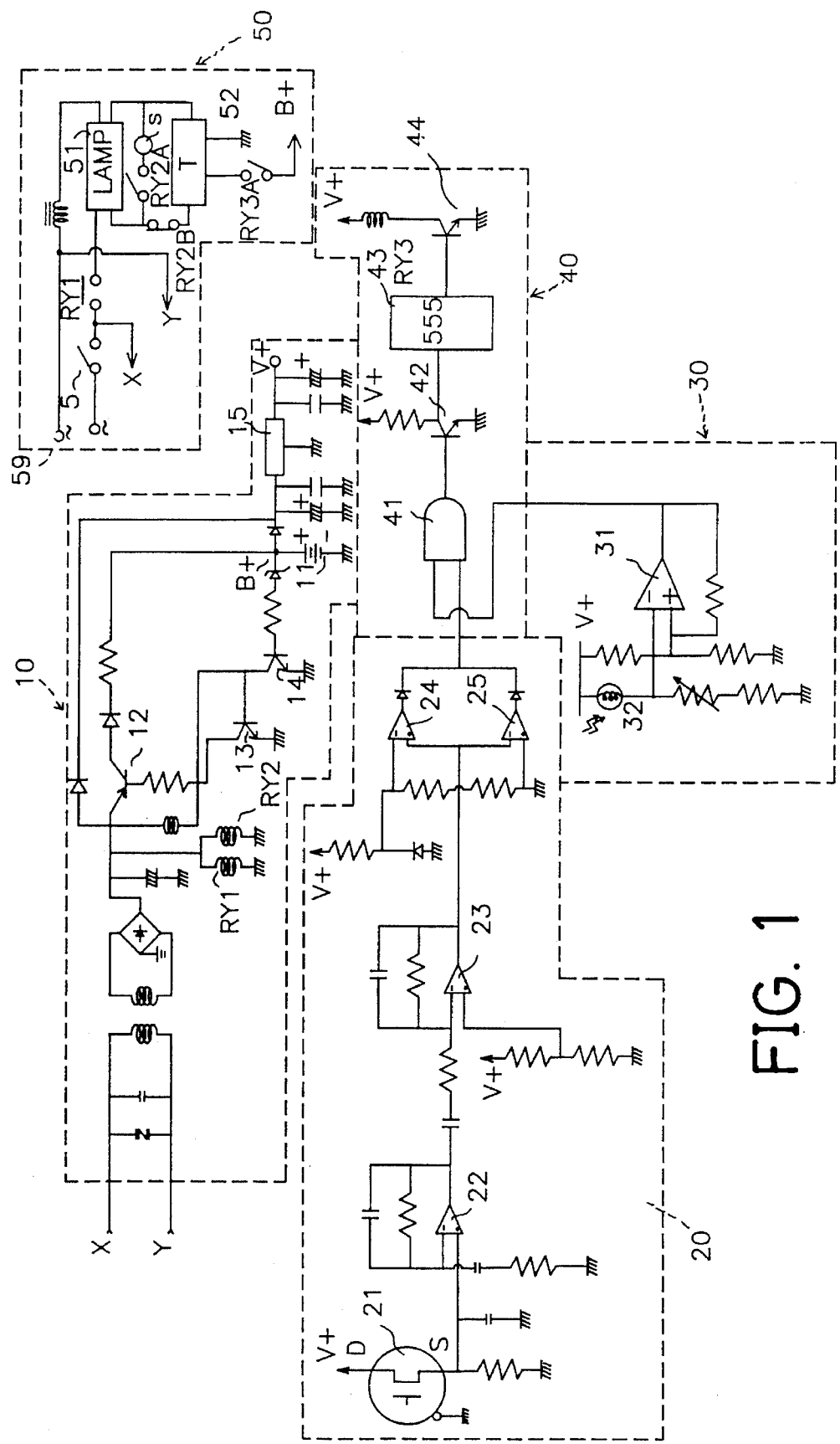
FIG. 1 is a circuit diagram of an intelligent light apparatus in accordance with the present invention.

Referring to FIG. 1, an intelligent illumination apparatus in accordance with the present invention comprises a battery charging means 10, a human body detecting means 20, a lightness detecting means 30, a timer/driving means 40, and a light means 50. The light means 50 comprises a switch 5 serially connected to a fluorescent lamp 51 via a first relay RY1. The first relay RY1 is normally open as shown in FIG. 1. A normally open contact RY2A of a second relay RY2 is connected to the fluorescent lamp 51 in parallel. A normally closed contact RY2B of the second relay RY2, a DC/AC converter 52, and the normally open contact RY2A are connected in a loop. A starter S is connected to the normally open contact of the second relay RY2 in series. The DC/AC converter 52 includes a triggering terminal T which if triggered by a DC voltage will enable the DC/AC converter 52 to output a high frequency AC voltage to turn on the fluorescent lamp 51. An AC power source 59 is connected to the fluorescent lamp 51 via the switch 5 and the first relay RY1. Two conductive wires X and Y are connected to the battery charging means 10. The AC power source 59 is electrically connected to the battery charging means 10 via the wires X and Y when the switch 5 is manually turned on.

The battery charging means 10 is a DC power supply structure including a voltage-decreasing transformer, a full-wave rectifier, a filter capacitor, three transistors 12, 13, 14, a rechargeable battery 11, and a voltage regulator 15 which may be a commercialized IC 7805. A first relay coil RY1 and a second relay coil RY2 are connected with the filter capacitor in parallel. A DC voltage V+ is obtained at the regulator 15 and supplied to the components of the circuit.

As mentioned previously, the AC power source 59 is electrically connected to the battery charging means 10 via the wires X and Y when the switch 5 is manually turned on. When the AC power source 59 is electrically connected to the battery charging means 10, the first relay coil RY1 and the second relay coil RY2 are energized by a filtered voltage obtained at the filter capacitor, thereafter, the normally opened first relay RY1 is turned on, the normally closed contact RY2B of the second relay RY2 is turned off, and the normally open contact RY2A of the second relay RY2 is turned on. A loop is formed by the fluorescent lamp 51, the normally open contact RY2A, and the starter S when the normally open contact RY2A is turned on. Therefore, the fluorescent lamp 51 is turned on similar to a conventional fluorescent lamp when the switch 5 is turned on. The rechargeable battery 11 is charged when the switch 5 is manually turned on.

The fluorescent lamp 51 is turned off when the mains is cut off due to a turning off of the switch 5 or due to other reasons such as a malfunction of the power station. However, the fluorescent lamp 51 may be turned on if the DC/AC converter 52 outputs the high frequency AC voltage regardless of the off status of the switch 5 or the cutting off of the mains. Therefore, the fluorescent lamp 51 may be turned on either by the turning on of the switch 5 or the triggering on of the DC/AC converter 52. The third relay RY3 is turned on to electrically connect the rechargeable battery 11 to trigger the DC/AC converter 52 when the lightness of the environment around the intelligent illumination apparatus is below a predetermined level and a person is approaching in a predetermined distance from the intelligent illumination apparatus.

The human body detecting means 20 comprises a passive infrared sensor 21 connected to a first band-pass filter 22 connected to a second band-pass filter 23 connected to a Schmitt triggering circuit formed by two operational amplifiers 24, 25. The first band-pass filter 23 together with the second band-pass filter 23 constitute a two-stage band-pass filter for filtering out noises. A human approaching indicative signal with a logical high voltage is outputted from the Schmitt triggering circuit to the timer driving means 40 when the passive infrared sensor 21 detects a human body is approaching within a predetermined distance.

The light illumination detecting means 30 comprises a photoresistor 32 connected to a comparator 31 which may be an operational amplifier. Normally the comparator 31 outputs a logical low signal when the environmental lightness is greater than a predetermined level. The comparator 31 outputs a lightness insufficiency indicative signal with a logical high voltage when the environmental lightness is less than a predetermined level. The photoresistor 32 is used to detect the lightness of the environment.

The timer driving means 40 comprises an AND gate 41 connected to a transistor 42 connected to a timer 43 connected to a driving transistor 44. The timer 43 is a commercialized 555 timer. The transistor 42 is turned on when the AND gate 41 receives both the human approaching indicative signal and the lightness insufficiency indicative signal, which in turn triggers the timer 43 to turn on the driving transistor 44. The coil RY3 of the third relay RY3 connected to the driving transistor 44 is energized by the driving transistor 44 and turns on the normally open contact RY3A of third relay RY3 thereby triggering the DC/AC converter 52 to output the high frequency AC voltage to turn on the fluorescent lamp 51. When the human body leaves or when the lightness of the environment becomes greater than the predetermined level, the transistor 42 is turned off which in turn stops triggering the timer 43, yet the timer 43 will not turn off the driving transistor 44 immediately but delay for a predetermined time period and then turn off the driving transistor 44. The coil of the third relay RY3 is deenergized when the driving transistor 44 is turned off. The normally open contact RY3A of the third relay RY3 recovers to a normally open status when the coil of the third relay RY3 is deenergized. Additionally, if a thief enters the house at night, the fluorescent lamp 51 will be automatically turned on thus frightening the thief.

Actually the present invention can be modified to be a security device by respectively replacing the lamp 51, the human body detecting means 20, and the lightness detecting means 30 with a buzzer, a gas detecting means and a smoke detecting means.

I claim:

1. An intelligent illumination apparatus comprising:

a light means comprising a switch, serially connected to a fluorescent lamp via a first relay which is normally open and being connected to an AC power source, a DC/AC converter connected to the fluorescent lamp via a normally closed contact of a second relay, a normally open contact of the second relay serially connected to a starter and together connected to the fluorescent lamp in parallel, the DC/AC converter comprising a triggering terminal connected to an auxiliary DC voltage via a third relay which is normally open, whereby the DC/AC converter when supplied with the auxiliary voltage will output a relatively high frequency AC voltage to turn on the fluorescent lamp;

a battery charging means comprising and coil of the first relay, a coil of the second relay, a recharging circuit and a rechargeable battery and being connected to the AC power source via the switch of the light means, the rechargeable battery being charged to the auxiliary voltage via the AC power source and the recharging circuit when the switch of the light means is turned on and being available to supply the auxiliary voltage to the intelligent illumination apparatus when the switch of the light means is turned off;

a human body detecting means generating a human approaching indicative signal in response to a human body approaching within a predetermined distance;

a lightness detecting means detecting environmental lightness and outputting a lightness insufficiency indicative signal when the environmental lightness is less than a predetermined level;

a timer/driving means energizing and turning on the third relay in response to the simultaneous presence of the human approaching indicative signal and the lightness insufficiency indicative signal, thus triggering the DC/AC converter to output the high frequency AC voltage to turn on the fluorescent lamp.

2. The intelligent illumination apparatus as claimed in claim 1, wherein the human body detecting means comprises a passive infrared sensor connected to a two-staged band-pass filter for filtering out noises which is connected to a Schmitt triggering circuit formed by two operational amplifiers.

3. The intelligent illumination apparatus as claimed in claim 1, wherein the light illumination detecting means comprises a photoresistor connected to a comparator such that when environmental lightness is below a predetermined level, the photoresistor will sense the lightness and the comparator will output the lightness insufficiency indicative signal.

4. The intelligent illumination apparatus as claimed in claim 1, wherein the timer driving means comprises an AND gate connected to a transistor connected to a timer connected to a driving transistor connected to a coil of the third relay, the transistor being turned on when the AND gate receives both the human approaching indicative signal and the lightness insufficiency indicative signal, which in turn triggers the timer to turn on the driving transistor thus energizing the coil of the third relay and turning on the third relay.

* * * * *